(12) United States Patent
Bumbulis et al.

(10) Patent No.: US 10,346,387 B2
(45) Date of Patent: Jul. 9, 2019

(54) REPLICATION OF LOG-STRUCTURED DATA

(71) Applicant: SAP SE, Walldorf (DE)

(72) Inventors: Peter Bumbulis, Cambridge (CA); Jeffrey Pound, Kitchener (CA); Nathan Auch, Waterloo (CA); Anil Kumar Goel, Waterloo (CA); Matthias Ringwald, Potsdam (DE); Thomas Bodner, Berlin (DE); Scott MacLean, Waterloo (CA)

(73) Assignee: SAP SE, Walldorf (DE)

( * ) Notice: Subject to any disclaimer, the term of this patent is extended or adjusted under 35 U.S.C. 154(b) by 391 days.

(21) Appl. No.: 15/180,720

(22) Filed: Jun. 13, 2016

(65) Prior Publication Data

US 2017/0357683 A1     Dec. 14, 2017

(51) Int. Cl.
*G06F 16/23*      (2019.01)
*G06F 16/27*      (2019.01)
(Continued)

(52) U.S. Cl.
CPC ...... *G06F 16/2358* (2019.01); *G06F 11/1471* (2013.01); *G06F 11/1474* (2013.01);
(Continued)

(58) Field of Classification Search
CPC ........... G06F 17/30368; G06F 11/1471; G06F 11/1474; G06F 11/2058; G06F 11/2066;
(Continued)

(56) References Cited

U.S. PATENT DOCUMENTS 6,167,490 A * 12/2000 Levy .................. G06F 12/0813
                                                    711/120
8,825,666 B1 * 9/2014 Lentini ............. G06F 17/30336
                                                    707/747
(Continued)

FOREIGN PATENT DOCUMENTS

WO     2015/200686 A1    12/2015

OTHER PUBLICATIONS

Goel, Anil K. et al. "Towards Scalable Realtime Analytics: An Architecture for Scaleout of OLxP Workloads", Proceedings of the VLDB Endowment, vol. 8, No. 12, 2015, (pp. 1716-1727, 12 total pages).
(Continued)

*Primary Examiner* — Kris E Mackes
*Assistant Examiner* — Lin Lin M Htay
(74) *Attorney, Agent, or Firm* — Buckley, Maschoff & Talwalkar LLC

(57) ABSTRACT

A method includes a primary storage unit receiving a first write request including a first key and a first value; persisting the first value in a first non-volatile memory in association with the first key; broadcasting the first write request and a first set of globally-durable keys to secondary storage units; receiving, from the secondary storage units, an acknowledgement of the first write request and a first set of locally-durable keys, each of the first sets of locally-durable keys including the first key; the primary storage unit receiving a second write request including a second key and a second value; persisting the second value in the first non-volatile memory in association with the second key; and broadcasting the second write request and a second set of globally-durable keys to the secondary storage units, the second set of locally-durable keys including the first key. A system is also disclosed.

16 Claims, 13 Drawing Sheets

(51) Int. Cl.
*G06F 11/14* (2006.01)
*G06F 11/20* (2006.01)

(52) U.S. Cl.
CPC ...... *G06F 11/2058* (2013.01); *G06F 11/2066* (2013.01); *G06F 11/2082* (2013.01); *G06F 11/2097* (2013.01); *G06F 16/2365* (2019.01); *G06F 16/2379* (2019.01); *G06F 16/27* (2019.01)

(58) Field of Classification Search
CPC ............ G06F 11/2082; G06F 11/2097; G06F 17/30371; G06F 17/30377; G06F 17/30575; G06F 16/2358; G06F 16/27; G06F 16/2379; G06F 16/2365
See application file for complete search history.

(56) References Cited

U.S. PATENT DOCUMENTS

| | | | | |
|---|---|---|---|---|
| 8,930,648 | B1* | 1/2015 | Storer | G06F 12/0292 711/154 |
| 2012/0166407 | A1* | 6/2012 | Lee | G06F 9/466 707/703 |
| 2013/0036278 | A1* | 2/2013 | Strzelczak | G06F 11/14 711/161 |
| 2014/0149355 | A1 | 5/2014 | Gupta et al. | |
| 2014/0149357 | A1* | 5/2014 | Gupta | G06F 17/30008 707/652 |
| 2014/0201467 | A1* | 7/2014 | Blaner | G06F 12/0831 711/146 |
| 2014/0279920 | A1* | 9/2014 | Madhavarapu | G06F 17/30283 707/649 |
| 2015/0019516 | A1 | 1/2015 | Wein et al. | |

OTHER PUBLICATIONS

Hunt, Patrick et al., "ZooKeeper: Wait-free coordination for Internet-scale systems", In Proc ATC'10, USENIX Annual Technical Conference, (2010), (pp. 1-14, 14 total pages).
Lamport, Leslie "The Part-Time Parliament", ACM Transactions on Computer Systems, vol. 16, No. 2, May 1998, (pp. 133-169, 37 total pages).
Ongaro, Diego et al. "In Search of an Understandable Consensus Algorithm", USENIX Annual Technical Conference, 2014 (pp. 305-319, 16 total pages).
van Renesse, Robbert et al. "Chain Replication for Supporting High Throughput and Availability", 2004, 14pgs.
"Communication: European Search Report", dated Oct. 26, 2017, European Patent Office, for European Application No. 17001003.7, 6pgs.

* cited by examiner

REPLICATION OF LOG-STRUCTURED DATA

BACKGROUND

Enterprise database systems store data related to many aspects of a business enterprise. Every transaction (where "transaction" refers to a set of operations) against the data stored in database causes a log record to be written into a transaction log. The log record typically describes the transaction and its effect on the data. The log records of the transaction log may therefore be used to recover from errors or to restore the database to a prior state.

Due to the importance of ensuring durability of the transaction log, systems are provided to replicate a log record written to a primary host on one or more other secondary hosts. A replication protocol is used to ensure that the writes are atomic (i.e., once a write has been acknowledged as successful all subsequent read requests will return that value) and meet any durability guarantees. The commonly-used two-phase commit protocol includes one two-message round trip in which a primary host issues an instruction to write data and the instruction is acknowledged by a secondary host, and a second two-message round trip in which the primary host instructs the secondary host to commit the write (i.e., make it durable) and the secondary host acknowledges that the write has become durable. To improve throughput and latency, it is desirable to achieve results similar to the two-phase commit protocol while requiring fewer messages.

BRIEF DESCRIPTION OF THE DRAWINGS

FIGS. 3A through 3C comprise flow diagrams of processes according to some embodiments.

DETAILED DESCRIPTION

The following description is provided to enable any person in the art to make and use the described embodiments. Various modifications, however, will remain readily apparent to those in the art.

Some embodiments may provide durability guarantees similar to the above-described two-phase commit protocol while requiring fewer messages. Such embodiments may advantageously exploit a system configuration in which each host allows writing to a given key at most once.

Figure 1:
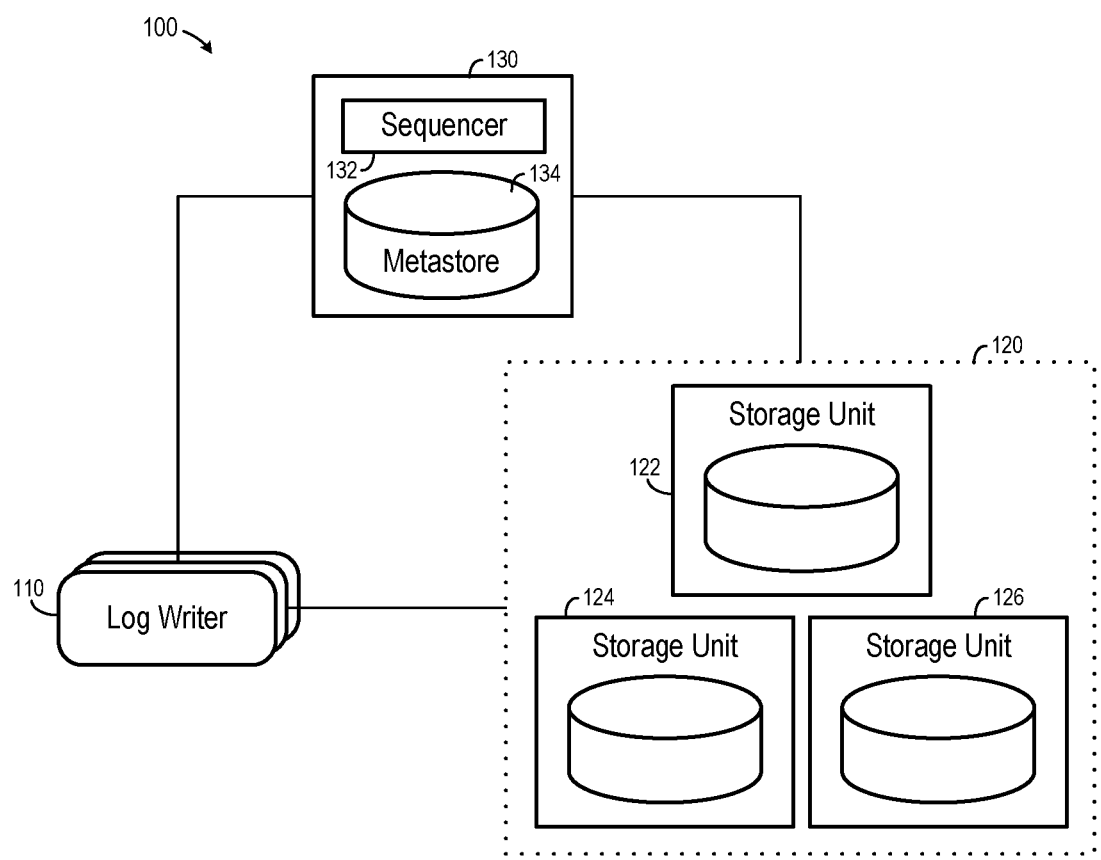
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes log writers 110, storage cluster 120 and management host 130. The elements of architecture 100 may operate to provide storage and replication of log data according to some embodiments.

Storage cluster 120 comprises three storage units 122, 124 and 126, but embodiments are not limited thereto. Each storage unit of storage cluster 120 is intended to store a replica of a particular data set, thereby providing fault-tolerance. Storage cluster 120 may comprise one primary storage unit and one or more secondary storage units. According to some embodiments, the primary storage unit receives write requests and manages replication and acknowledgement thereof as described herein.

Each of storage units 122, 124 and 126 may also be referred to as a "host", in that each may both manage and store data according to some embodiments. In this regard, each of storage units 122, 124 and 126 may comprise one or more computing devices, in turn including one or more processors, memory and software which is executable to cause the storage unit to operate as described herein.

Each of storage units 122, 124 and 126 may comprise any query-responsive data source or sources that are or become known, including but not limited to a structured-query language (SQL) relational database management system. Each of storage units 122, 124 and 126 may comprise a relational database, a multi-dimensional database, an eXtendable Markup Language (XML) document, or any other data storage system storing structured and/or unstructured data. Embodiments are not limited to any number or types of data sources. Storage cluster 120 may support multi-tenancy to separately support multiple unrelated clients by providing multiple logical database systems which are programmatically isolated from one another.

Each of log writers 110 may comprise one or more computing devices executing software to request the writing of log data to storage cluster 120. A log writer 110 may comprise a distributed node of a database management system according to some embodiments. Such a node may comprise one or more processors, memory and software which is executable to perform database management functions.

Management host 130 includes sequencer 132 and metastore 134. Sequencer 132 issues monotonically-increasing log sequence numbers to log writers 110 upon request. As will be described below, log writers 110 use such sequence numbers as keys in requests for writes to storage cluster 120.

Metastore 134 may store a directory of available storage units as well as storage cluster configuration information.

The storage cluster configuration information may define "epochs" which specify a primary storage unit and secondary storage units. Management host 130 and each storage unit of cluster 120 are aware of the current epoch. According to some embodiments, a storage unit does not accept write requests associated with epochs other than the current epoch. Metastore 134 may also be stored in distributed storage according to some embodiments.

Within metastore 134, different epochs may be associated with different primary and/or secondary storage units. Moreover, different epochs may be associated with different numbers of secondary storage units. The current epoch may change in response to failure of a storage unit as will be described below.

Figure 2:
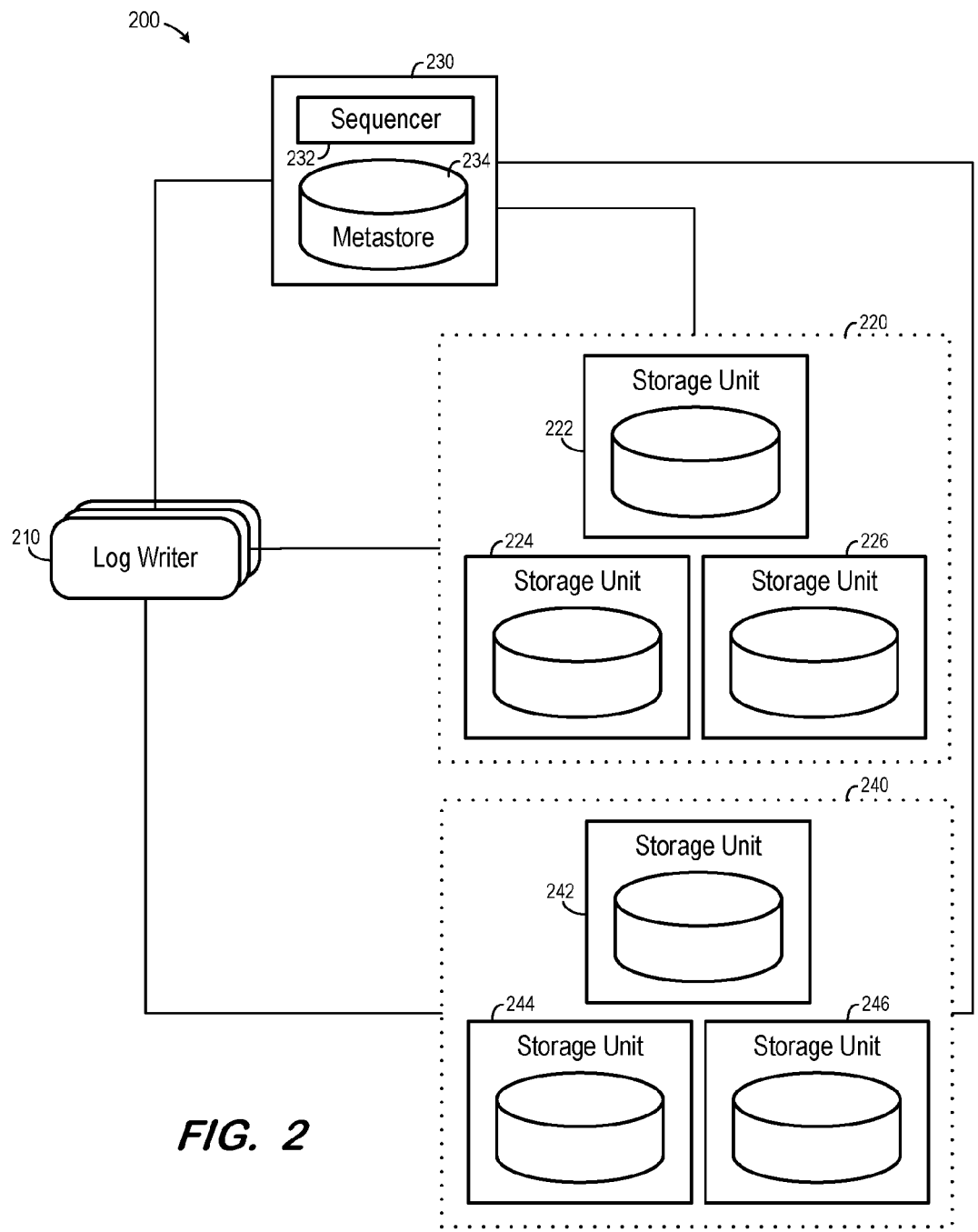
FIG. 2 is a block diagram of a system architecture according to some embodiments.

Metastore 134 may also store mappings between log fragments and storage clusters. Such mappings support striping, in which one storage cluster stores log fragments of one stripe of the overall log data, and other storage clusters store log fragments of other stripes of the overall log data. Architecture 200 of FIG. 2 illustrates a system which supports striping.

More particularly, the components of architecture 200 may be implemented as described above with respect to similarly-numbered components of architecture 100. However, it is assumed that storage cluster 220 stores log fragments of a first stripe of the overall log data, and storage cluster 240 stores log fragments of a second stripe of the overall log data. Metastore 234 maintains the stripe/cluster associations and provides these associations to log writers 220 (or to an intermediate demultiplexing component) so that write requests for particular log fragments may be directed to an appropriate cluster. For the current epoch, storage cluster 240 includes a single primary storage unit (e.g., storage unit 242) and two secondary storage units (e.g., storage units 244 and 246). The log data may be partitioned into more than two stripes, with a respective storage cluster (or clusters) assigned to store log fragments of each stripe.

Figure 3C:
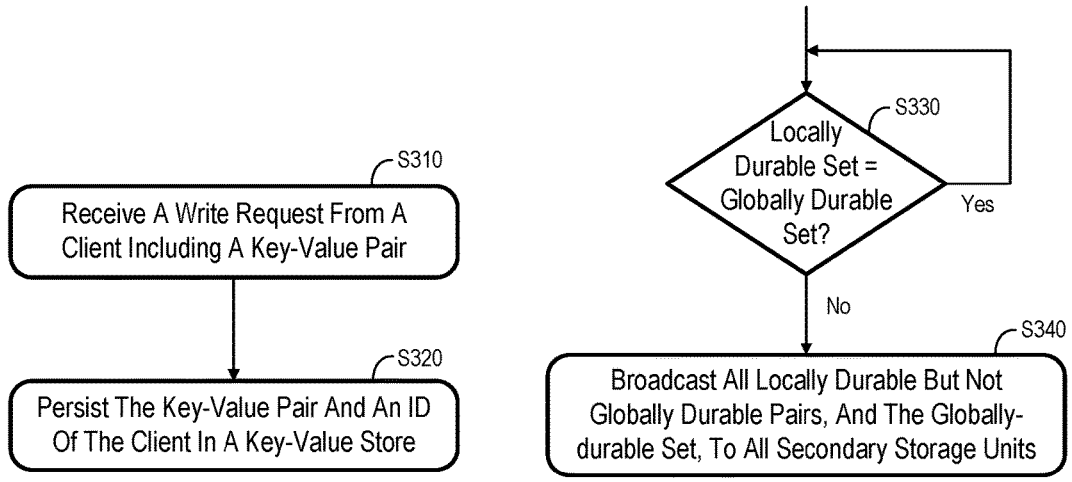
Figure 3C:
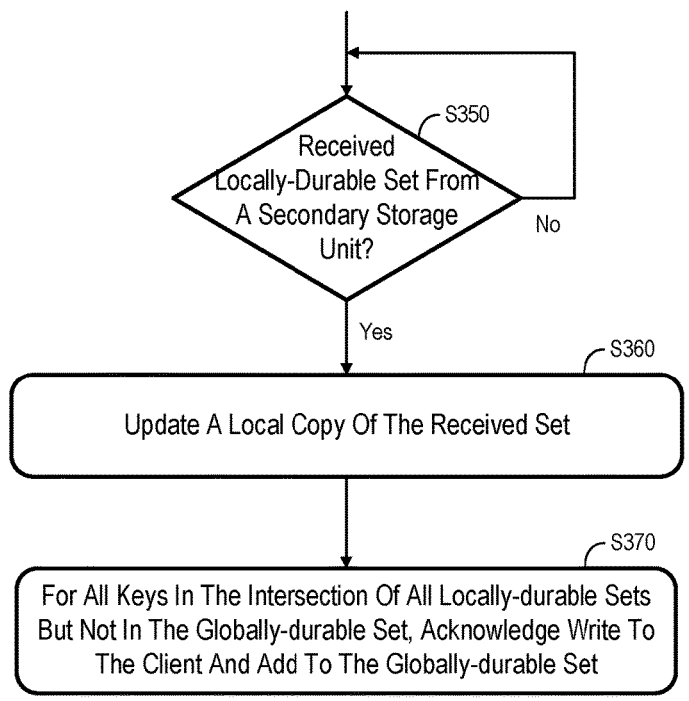
Figure 4:
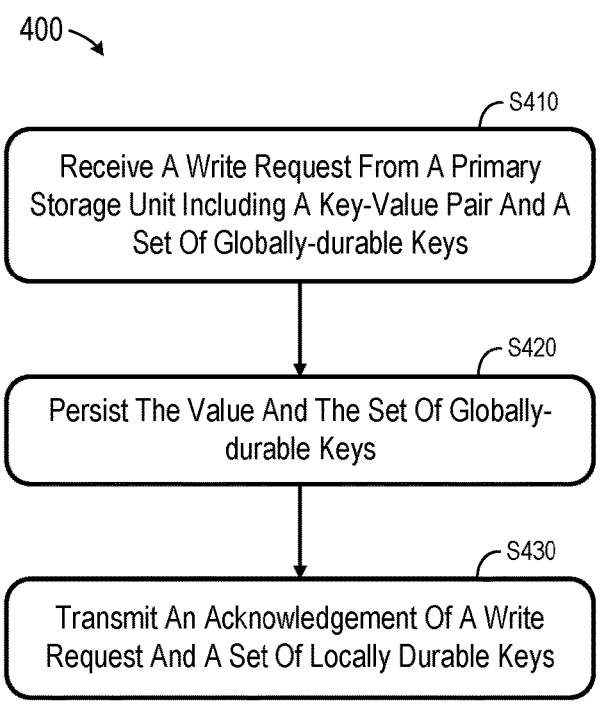
FIG. 4 is a flow diagram of a process according to some embodiments.

FIGS. 3A through 3C comprise flow diagrams of various processes according to some embodiments. In some embodiments, various hardware elements of a primary storage unit of a storage cluster execute program code to perform the processes as three independent execution threads. Similarly, FIG. 4 comprises a flow diagram of process 400 and, in some embodiments, various hardware elements of a secondary storage unit of a storage cluster execute program code to perform process 400, in conjunction and as a counterpart to the processes of FIGS. 3A through 3C.

All processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Referring first to FIG. 3A, a request to write a key-value pair is received from a client at S310. The request may be received from a log writer such as log writer 210 of architecture 200. According to some embodiments, a log writer 210 requests a log sequence number from sequencer 232 of management host 230 for use as the key of the key-value pair, where the value of the pair is a log fragment. The log writer 210 may also receive, from management host 230, an identifier of the current epoch and of the primary storage unit associated with the stripe to which the log fragment belongs.

Figure 5:
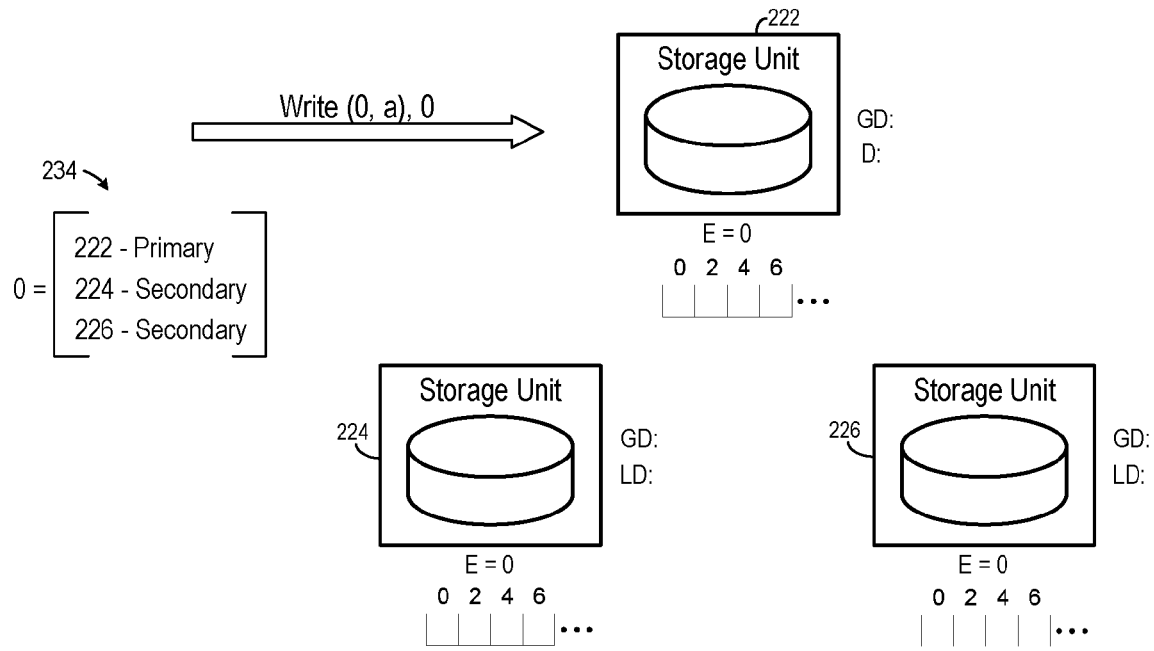
FIG. 5 is a diagram illustrating replication according to some embodiments.

FIG. 5 illustrates S310 according to some embodiments. As shown, primary storage unit 222 receives the write request "write (0, a), 0" from a client (not shown). The key-value pair is (0, a) and the trailing 0 indicates the current epoch.

FIG. 5 also shows the configuration of the current epoch (i.e., epoch 0) stored within metastore 234, and the storage of the metadata E=0 to denote the current epoch in each of primary storage unit 222, secondary storage unit 224 and secondary storage unit 226. Also shown in association with each storage unit are local memory buffers associated with the keys 0, 2, 4, 6, . . . .

Figure 6:
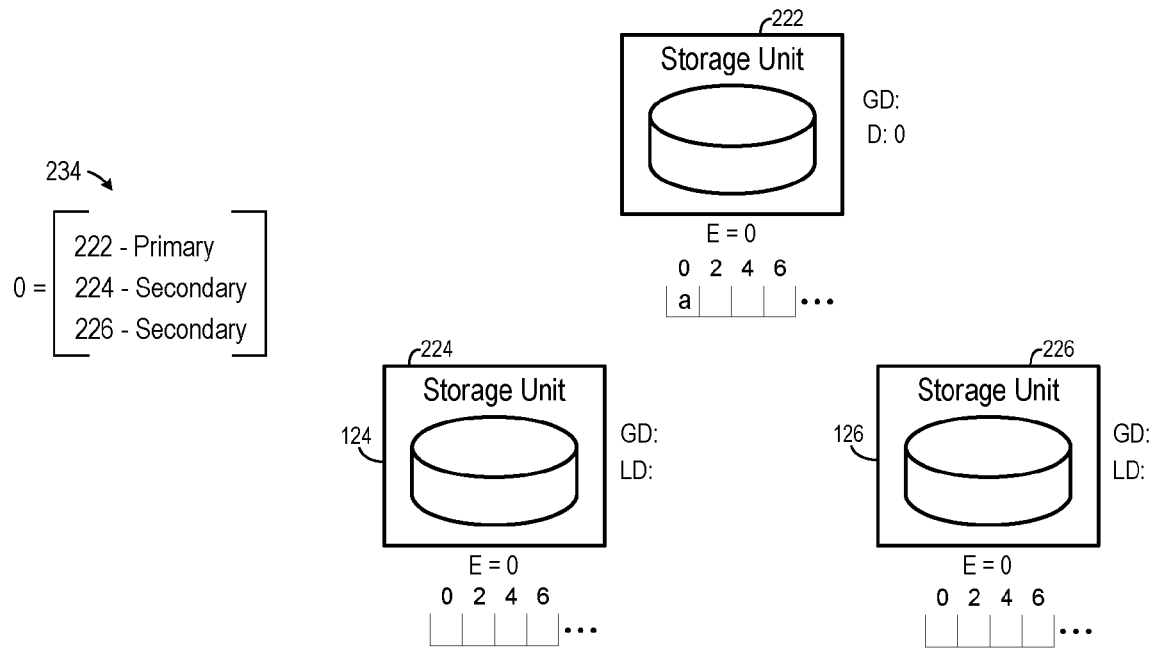
FIG. 6 is a diagram illustrating replication according to some embodiments.

Next, at S320, the key-value pair of the write request and an identifier of the client are persisted in a key-value store of the primary storage unit. FIG. 6 illustrates such storage of the value "a" within the local buffer of primary storage unit 222. Primary storage unit 222 maintains lists of globally-durable (i.e., GD) and locally durable (i.e., D) key-value pairs as also shown in FIG. 6 (i.e., D: 0). According to some embodiments, the epoch identified in the incoming write request is compared against the current epoch identifier stored at the primary storage unit. If the epochs do not match, the write request is ignored and/or rejected.

Figure 7:
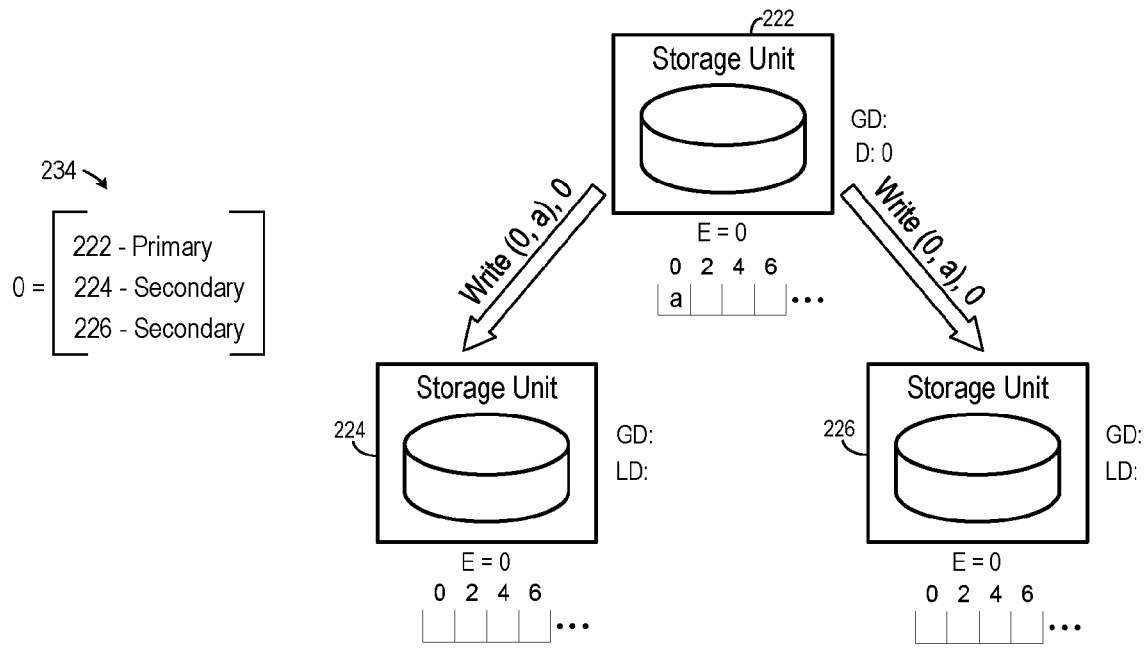
FIG. 7 is a diagram illustrating replication according to some embodiments.

Independently of S310 and S320, storage unit 222 may periodically determine at S330 whether its list of locally-durable pairs is identical to its list of globally-durable pairs. If not, all locally-durable pairs which are not globally durable are broadcast to all secondary storage units of the storage cluster, along with the set of globally-durable pairs. As will become clear from the following description, the set of globally-durable keys includes all keys for which a value has been made durable in each storage unit of the cluster and which may have been acknowledged as such to the client. In the present example, no keys are yet globally-durable so only the locally-durable pairs which are not globally durable (i.e., the pair (0, a)) are broadcast at S340 as a write instruction as shown in FIG. 7. The write instruction also includes the epoch "0" as described above.

Figure 8:
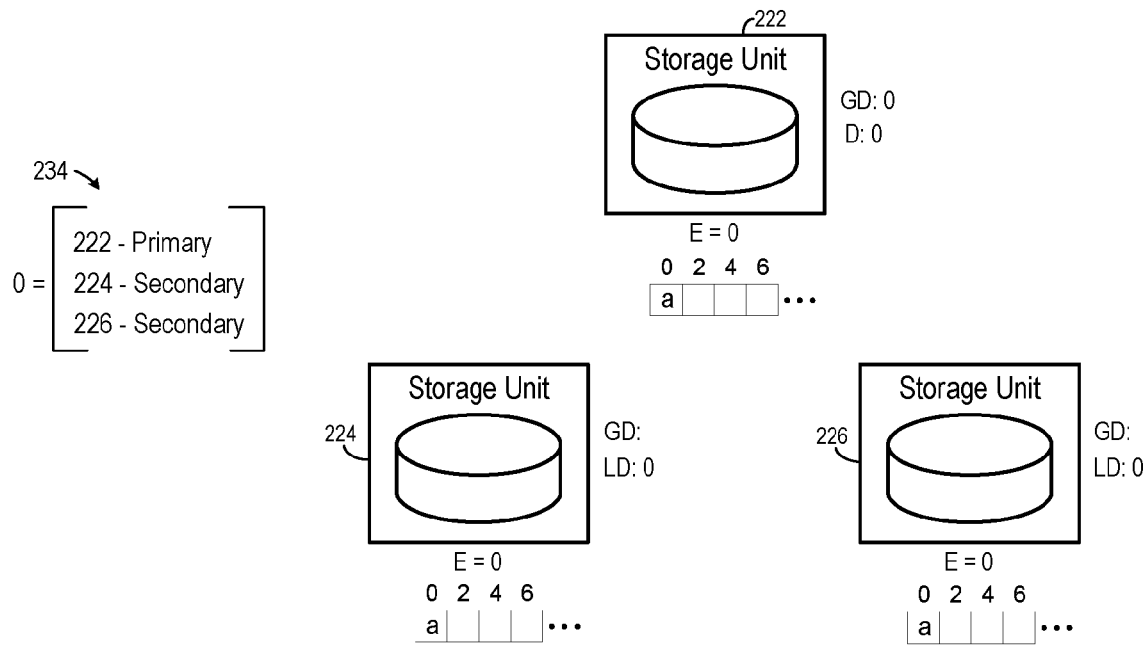
FIG. 8 is a diagram illustrating replication according to some embodiments.

Turning now to process 400, a secondary storage unit receives the write request from the primary storage unit at S410. The write request includes the key-value pair (i.e., (0, a)) and a set of globally-durable keys (i.e., currently empty). In response, the value of the key-value pair is locally-persisted in association with the key at S420, as shown in FIG. 8. Also persisted at S420 is the set of globally-durable keys (e.g., shown as GD in FIG. 7) which, at this point of the present example, is an empty set. FIG. 8 also shows that the list of locally-durable keys (i.e., LD) for each secondary storage unit has been updated to reflect the durability of the value associated with key 0.

Figure 9:
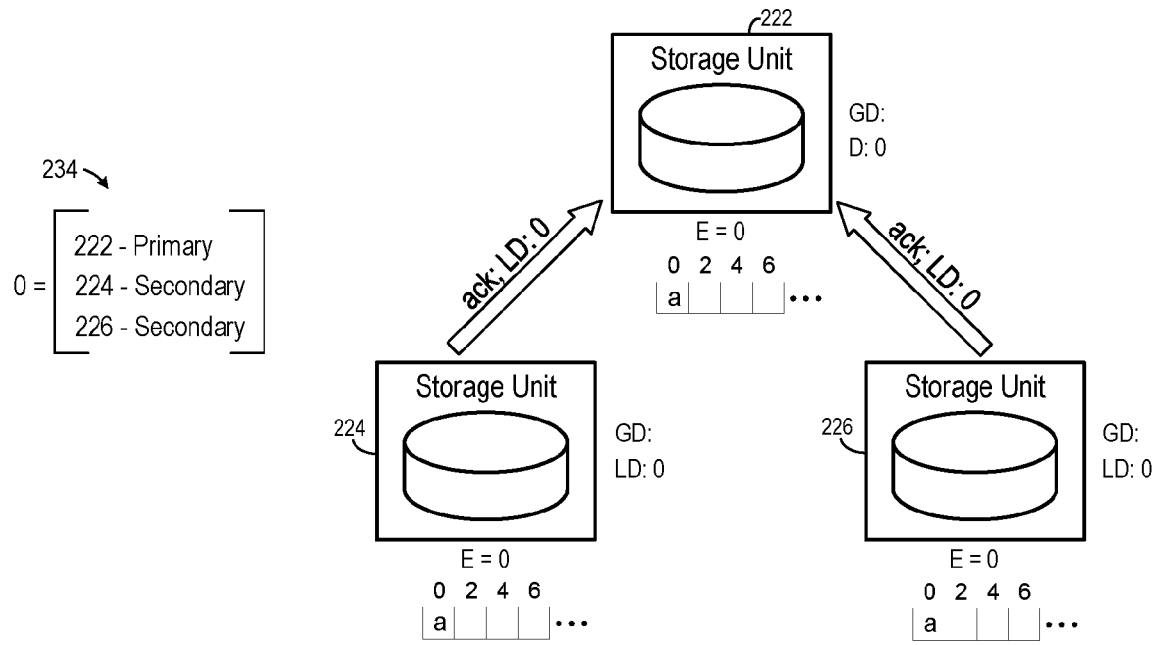
FIG. 9 is a diagram illustrating replication according to some embodiments.

Next, at S430, the storage unit transmits an acknowledgement of the write request and a list of its locally-durable key-value pairs to the primary storage unit. FIG. 9 illustrates S430 according to some embodiments, as executed in parallel by both storage unit 224 and storage unit 226.

Figure 10:
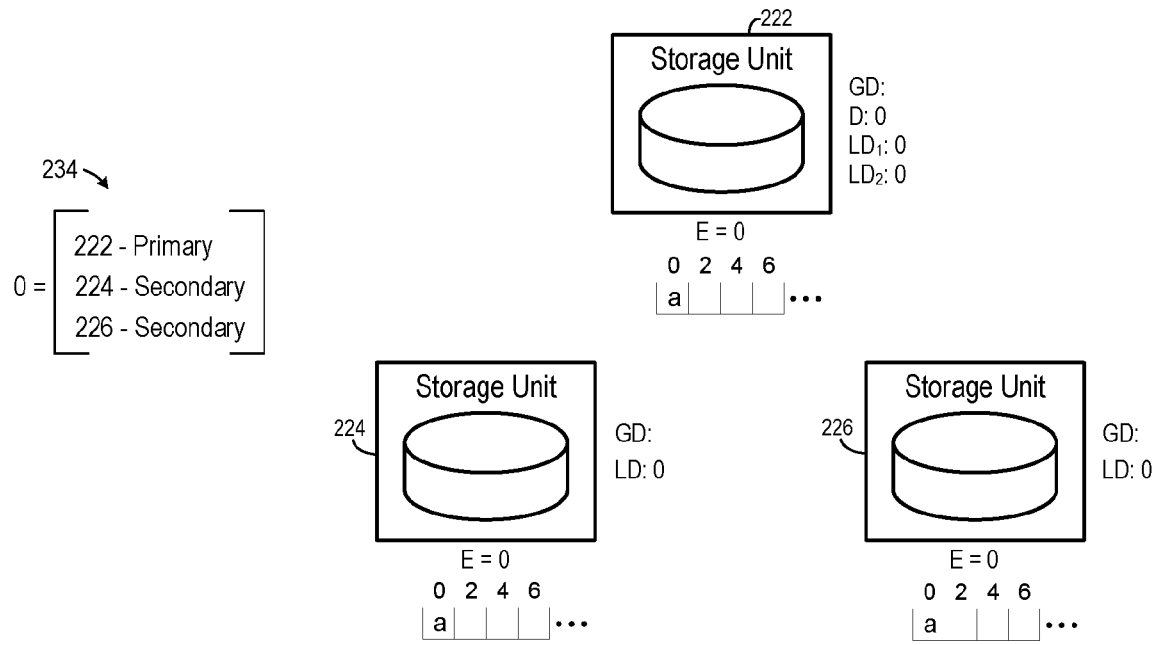
FIG. 10 is a diagram illustrating replication according to some embodiments.

The acknowledgement and set of locally-durable keys are received by another independent thread of the primary storage unit 222 at S350 of FIG. 3C. At S360, the primary storage unit updates a local copy of the received set of locally-durable keys. As shown in FIG. 10, primary storage unit 222 maintains a copy of the key-value pairs which have been indicated as locally-durable by each associated storage unit. The list $LD_1$, for example, includes the pairs which have been indicated as locally-durable by storage unit 224, and the list $LD_2$ includes the pairs which have been indicated as locally-durable by storage unit 226.

Figure 11:
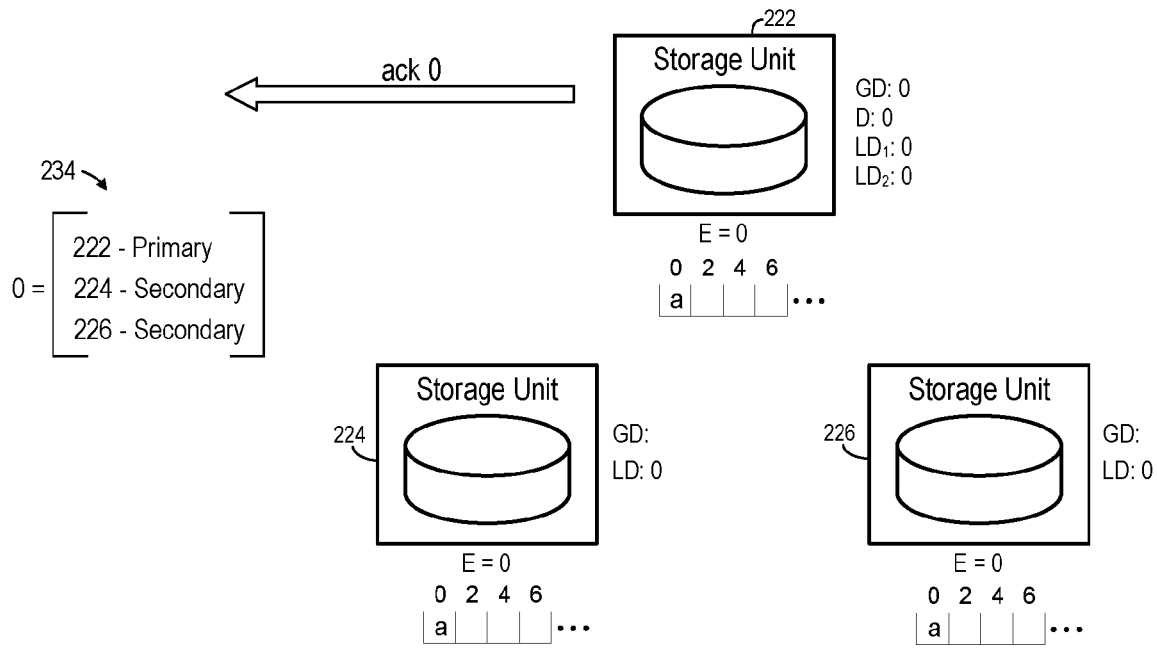
FIG. 11 is a diagram illustrating replication according to some embodiments.

Next, at S370, a write is acknowledged for all keys which are in the intersection of the local copies of the durable sets maintained at primary storage unit 222 but which are not in the globally-durable set. With respect to the present example, the intersection of $LD_1$ and $LD_2$ is key 0, and key 0 is not currently listed in the globally-durable set. Accordingly, and as shown in FIG. 11, an acknowledgement of the write of key 0 and its value are acknowledged to the client, thereby indicating to the client that the write is globally-durable.

Figure 12:
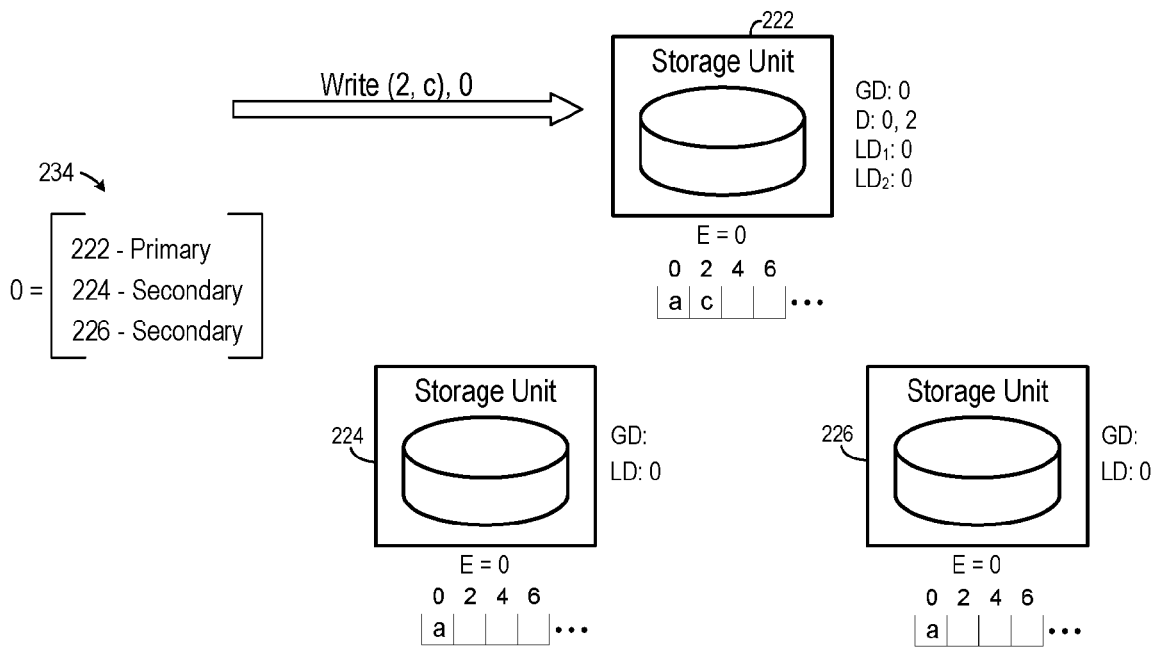
FIG. 12 is a diagram illustrating replication according to some embodiments.

It will now be assumed that a second write request including a second key-value pair is received at S310 by primary storage unit 222 as shown in FIG. 12. Again, the value of the pair is persisted at S320 in the key-value store of primary storage unit 222. FIG. 12 illustrates such storage of the value "c" within the local buffer of primary storage unit 222, and updating of its list of durable values (e.g., D: 0, 2).

Figure 13:
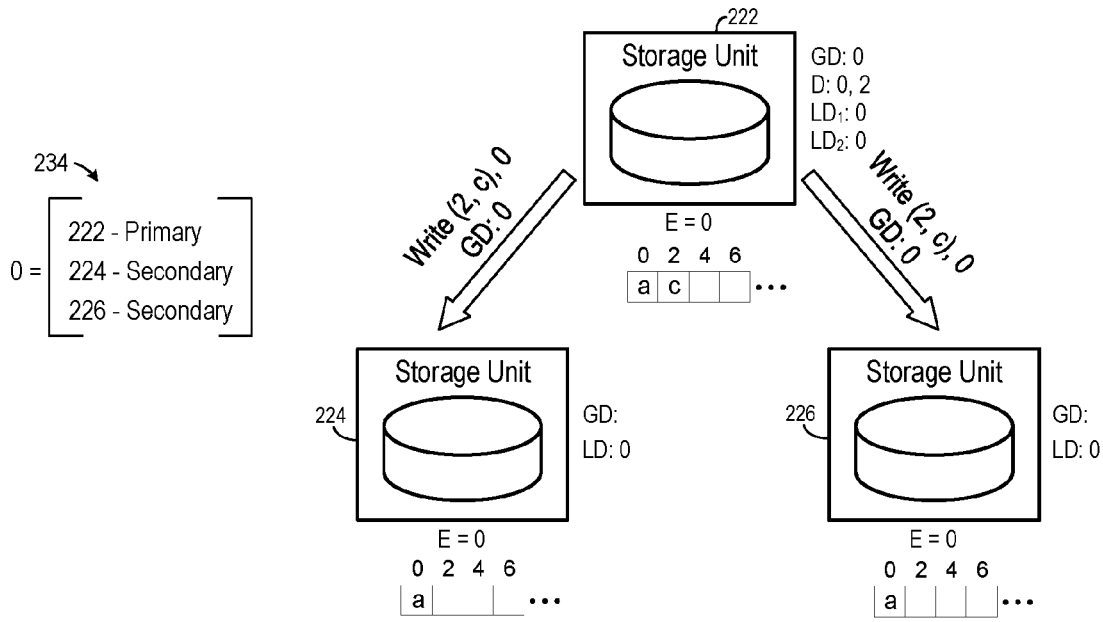
FIG. 13 is a diagram illustrating replication according to some embodiments.

As a result, it is eventually determined at S330 that the list of locally-durable pairs (i.e., D: 0, 2) is not identical to the list of globally-durable pairs (i.e., GD: 0). All locally-durable pairs which are not globally durable are therefore broadcast to all secondary storage units of the storage cluster, along with the set of globally-durable pairs, at S340. FIG. 13 illustrates such a broadcast according to the present example.

Figure 14:
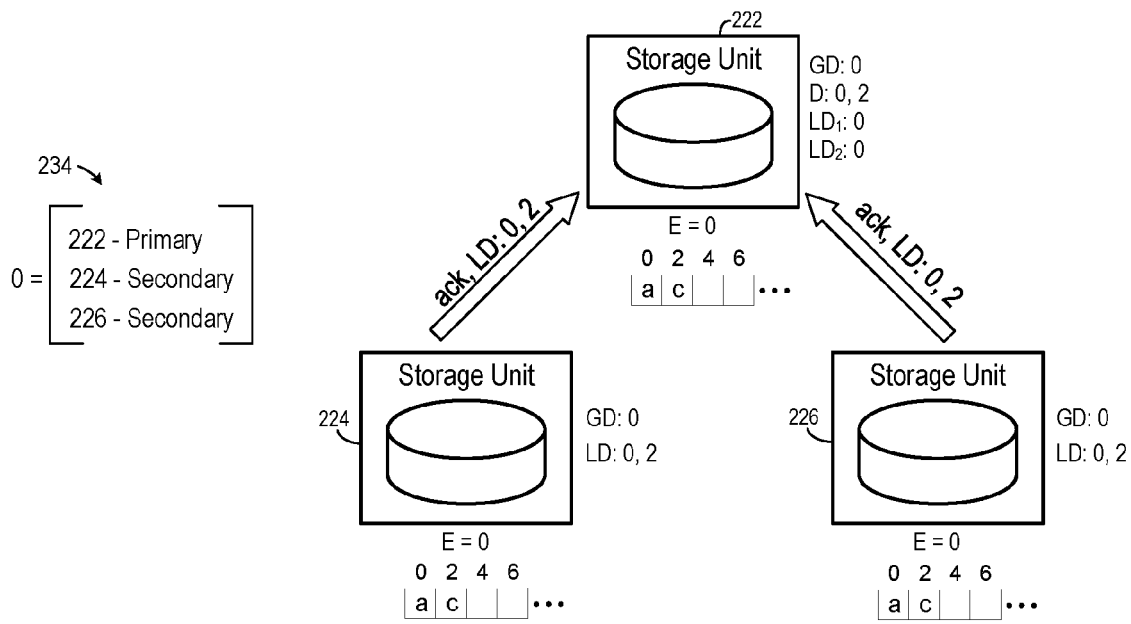
FIG. 14 is a diagram illustrating replication according to some embodiments.

Secondary storage units 224 and 226 receive the broadcast at S410 and persist the value of the key-value pair in association with the key at S420, as shown in FIG. 14. As also shown in FIG. 14, the received set of globally-durable keys (i.e., GD: 0) is also persisted in each secondary storage unit at S420. At S430, each storage unit transmits an acknowledgement of the write request and a list of its locally-durable key-value pairs to the primary storage unit, as additionally illustrated in FIG. 14.

Figure 15:
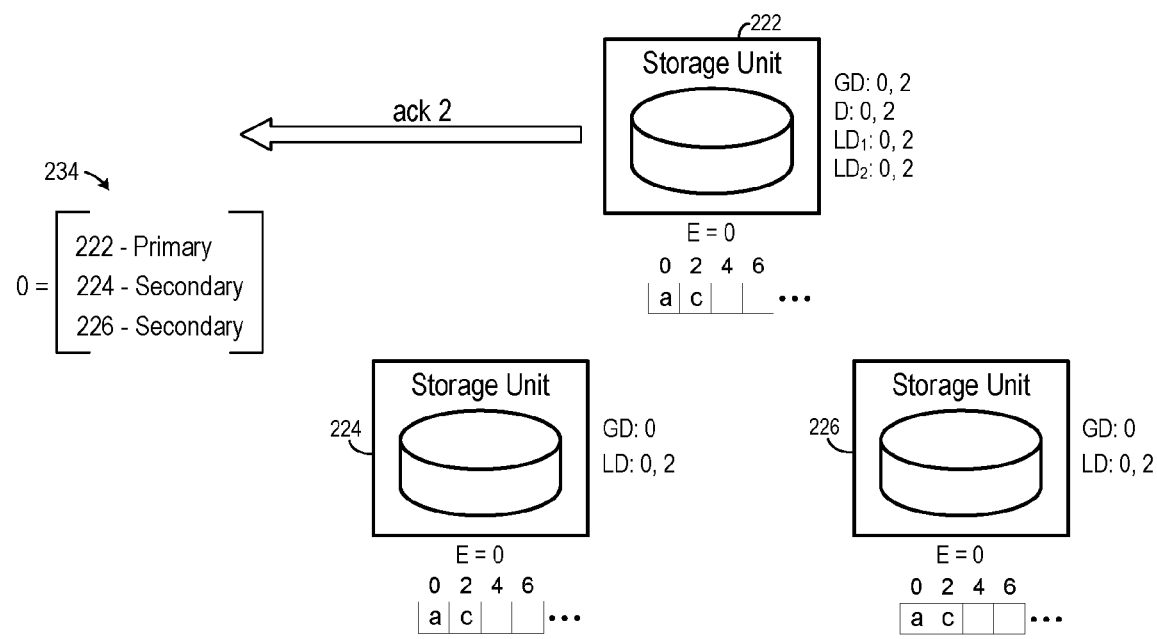
FIG. 15 is a diagram illustrating replication according to some embodiments.

The acknowledgements and sets of locally-durable keys are received by the primary storage unit 222 at S350 as described above. The primary storage unit then updates its local copies of the received set of locally-durable keys at S360. FIG. 15 illustrates lists $LD_1$ and $LD_2$ as updated to include the pairs which were indicated as locally-durable by storage unit 226. FIG. 15 also illustrates acknowledgement of a write for all keys which are in the intersection of the local copies of the durable sets maintained at primary storage unit 222 but which are not in the globally-durable set. With respect to the present example, the intersection of $LD_1$ and $LD_2$ consists of keys 0 and 2, of which key 2 is not currently listed in the globally-durable set.

Flow continues as described above to receive and acknowledge write requests. Accordingly, some embodiments may overlay messages 3 and 4 of a two-phase commit sequence with messages 1 and 2 of a next two-phase commit sequence. Due to the monotonic key space of the log data structure, and an assumption that log positions are written nearly in order, some embodiments may provide a compact representation of the durable set and may therefore be suitable for replicating log writes.

Secondary storage units 224 and 226 may service read requests only for those keys which are known to them as globally-durable (i.e., keys belonging to a set of globally-durable keys received from primary storage unit 222). In some embodiments, read requests may be serviced by secondary storage units (for globally-durable keys) or by the primary storage unit (for primary durable keys) without regard to the epoch associated with the read request In some embodiments, the write request broadcast at S330 might only periodically include the current set of globally-durable keys. This reduces message size, while preventing the servicing by secondary storage units of read requests for keys that would otherwise be known to be globally-durable. These read requests may be forwarded to the primary storage unit for servicing.

Figure 16:
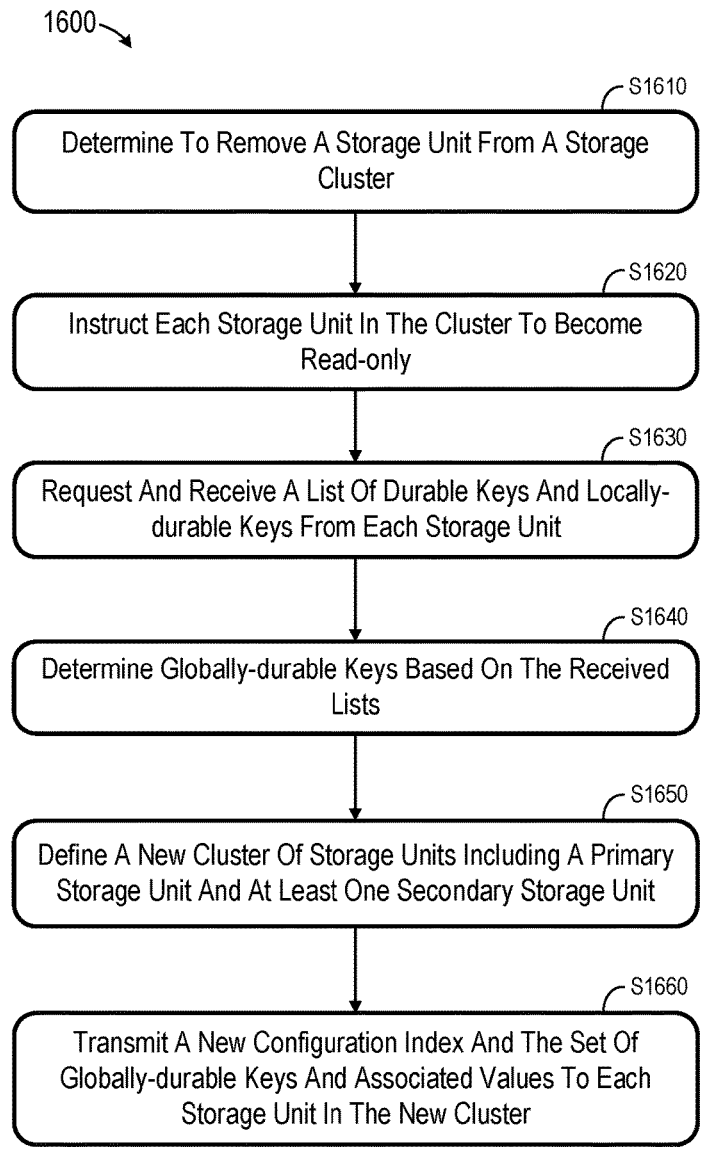
FIG. 16 is a flow diagram of a process according to some embodiments.

FIG. 16 is a flow diagram of process 1600 according to some embodiments. Process 1600 may be executed to redefine a storage cluster. Such a redefinition may be required due to a failure, or impending failure, of one of the cluster's constituent storage units. Accordingly, at S1610, management host 230 determines that a storage unit should be removed from a storage cluster.

At S1620, management host 230 instructs each storage unit in the cluster to become read-only (i.e., to stop accepting and processing write requests). According to some embodiments, other clusters (e.g., associated with other stripes) and their storage units need not be affected by process 1600.

Once the storage units have quiesced, management host 230 requests from each storage unit a list of locally-durable keys and, from the primary storage unit, a list of globally-durable keys. The currently-persisted epoch may also be requested from each storage unit at S1630.

Figure 17:
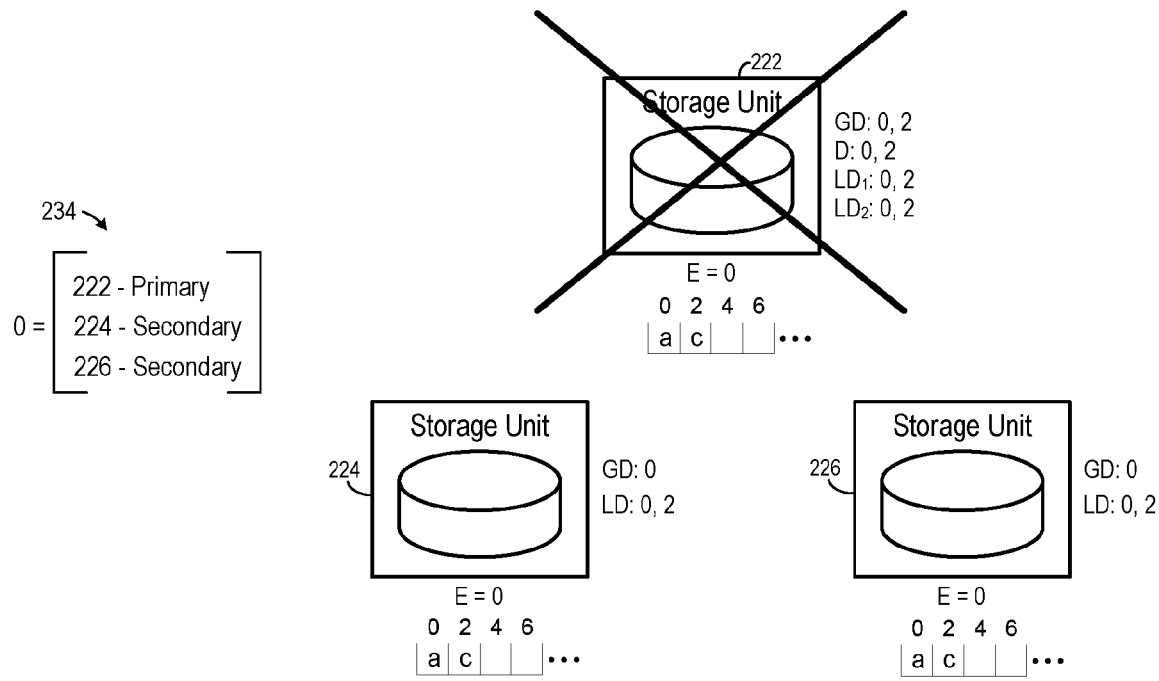
FIG. 17 is a diagram illustrating failure recovery according to some embodiments.

FIG. 17 illustrates an example in which primary storage unit 222 is determined to have failed. In response to the request of S1630, management host 230 receives GD: 0, LD: 0, 2 and E=0 from storage unit 224 and GD: 0, LD: 0, 2 and E=0 from storage unit 226.

Next, at S1640, the globally-durable keys are determined based on the received lists. If a storage unit returns lists along with a non-current epoch number, those lists are ignored. According to some embodiments, the globally-durable keys=((union durable) union (intersection locally-durable$_i$)). In the present example, the globally-durable keys=((union [0], [0]) union (intersection [0, 2], [0, 2]))= (([0]) union ([0, 2]))=[0, 2].

Figure 18:
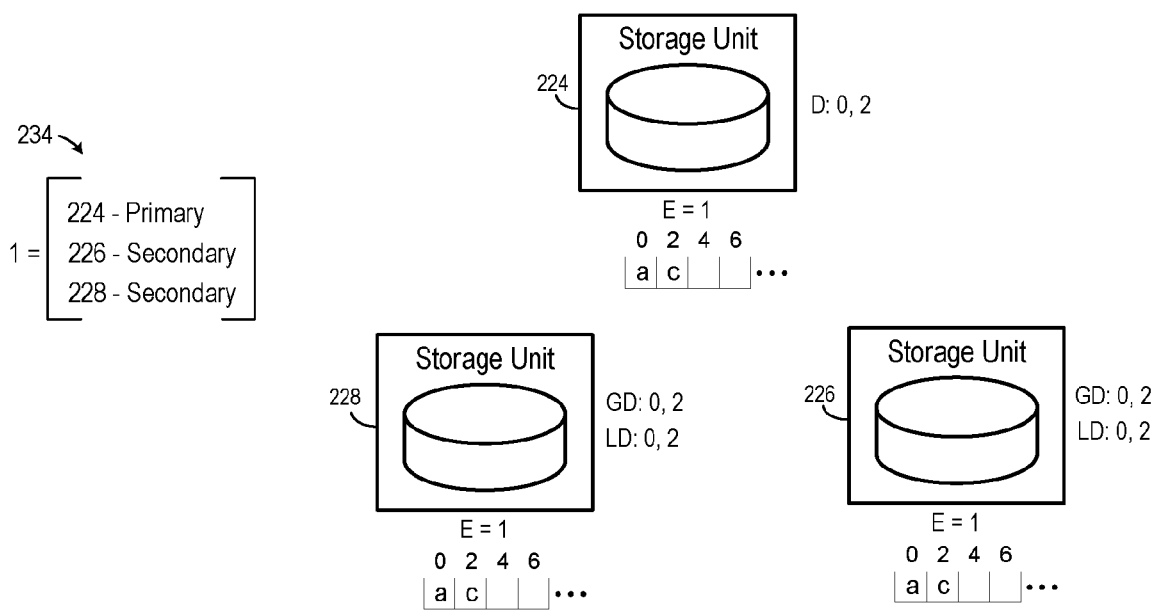
FIG. 18 is a diagram illustrating failure recovery according to some embodiments.

A new cluster of storage units is defined at S1650. The new cluster includes a primary storage unit and at least on secondary storage unit. The new cluster may be associated with a new epoch and the configuration thereof may be stored in metastore 234. FIG. 18 illustrates new configuration information stored in metastore 234 in association with new epoch 0. The new configuration information indicates that storage unit 234 is now the primary storage unit of the cluster, and that storage unit 228 has been added to the cluster.

Next, at S1660, a new configuration index (i.e., epoch number) and the set of globally-durable keys and associated values are transmitted to each storage unit in the new cluster. FIG. 18 also shows the new epoch number "1" and list of globally-durable keys 0, 2 stored at each storage unit after having been transmitted from management host 230 thereto at S1660.

Newly-added storage unit 228 retrieves the values a, c associated with globally-durable keys 0, 2 from the other storage units. The values a, c were already persisted by storage units 224 and 226 and therefore do not require retrieval thereby. Operation may then continue as described above. with respect to processes 300 and 400.

Figure 19:
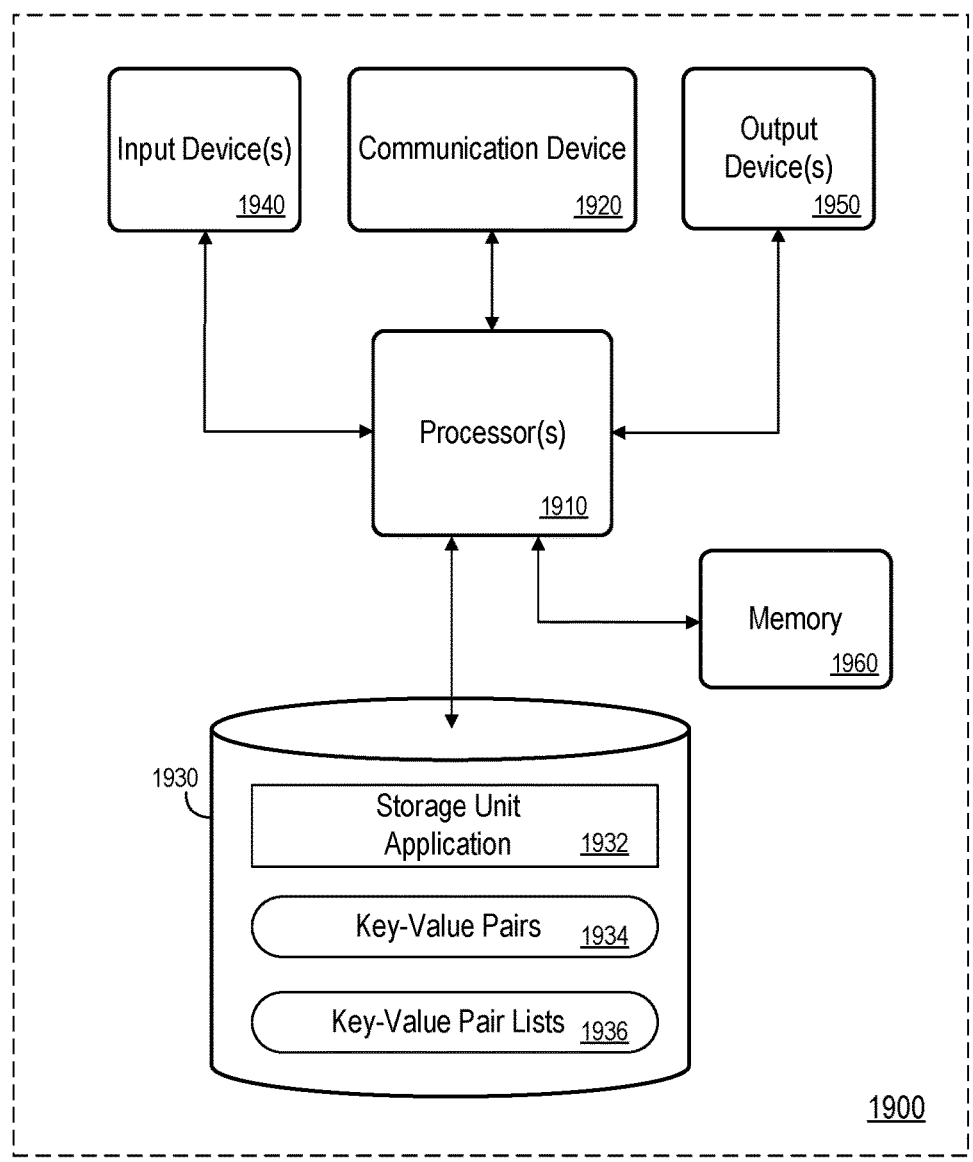
FIG. 19 is a block diagram of an apparatus according to some embodiments.

FIG. 19 is a block diagram of apparatus 1900 according to some embodiments. Apparatus 1900 may comprise a general-purpose computing apparatus and may execute program code to perform any of the functions described herein. Apparatus 1900 may comprise an implementation of a storage unit in some embodiments. Apparatus 1900 may include other unshown elements according to some embodiments.

Apparatus 1900 includes processor(s) 1910 operatively coupled to communication device 1920, data storage device 1930, one or more input devices 1940, one or more output devices 1950 and memory 1960. Communication device 1920 may facilitate communication with external devices, such as a log writer, a management host and/or another storage unit. Input device(s) 1940 may comprise, for example, a keyboard, a keypad, a mouse or other pointing device, a microphone, knob or a switch, an infra-red (IR) port, a docking station, and/or a touch screen. Input device(s) 1940 may be used, for example, to enter information into apparatus 1900. Output device(s) 1950 may comprise, for example, a display (e.g., a display screen) a speaker, and/or a printer.

Data storage device 1930 may comprise any appropriate persistent storage device, including combinations of magnetic storage devices (e.g., magnetic tape, hard disk drives and flash memory), optical storage devices, Read Only Memory (ROM) devices, etc., while memory 1960 may comprise Random Access Memory (RAM), Storage Class Memory (SCM) or any other fast-access memory.

Storage unit application 1932 may comprise program code executed by processor 1910 to cause apparatus 1900 to perform any one or more of the processes described herein. Embodiments are not limited to execution of these processes by a single apparatus. Key-value pairs may comprise log data as described herein and/or any other suitable data. Key-value pair lists 1936 may comprise lists of globally-durable and locally-durable keys as described herein. Data storage device 1930 may also store data and other program code for providing additional functionality and/or which are necessary for operation of apparatus 1900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising a primary storage unit and one or more secondary storage units:
   a primary storage unit comprising:
   a first non-volatile memory;
   a first memory storing processor-executable process steps;
   and a first processor to execute the processor-executable process steps to cause the primary storage unit to:
   define two or more epochs from a directory of available storage units and storage cluster configuration information, each of the epochs specifying a primary storage unit and a respective set of secondary storage units of the one or more secondary storage units;
   set each of the one or more secondary storage units to a respective epoch selected from the two or more epochs;
   designate one of the two or more epochs as a current epoch;
   receive a first write request from a client including a first key and a first value;
   persist the first value in the first non-volatile memory in association with the first key;
   broadcast the first write request and a first set of globally-durable keys to the one or more secondary storage units;
   receive, from each of the one or more secondary storage units set to the current epoch, an acknowledgement of the first write request and a first set of locally-durable keys, each of the first sets of locally-durable keys including the first key;
   each of the one or more secondary storage units not set to the current epoch ignores or rejects the first write request;
   in response to the reception of the acknowledgement of the first write request and the first set of locally-durable keys from each of the one or more secondary storage units, transmit an acknowledgement of the first write request to the client;
   receive a second write request from the client including a second key and a second value; persist the second value in the first non-volatile memory in association with the second key;
   and broadcast the second write request and a second set of globally-durable keys to the one or more secondary storage units, the second set of globally-durable keys including the first key;
   wherein the primary storage unit stores a first configuration index associated with the storage cluster, wherein the first write request includes a configuration index, and wherein the first processor is to execute the processor-executable process steps to cause the primary storage unit to:
   determine whether the received configuration index is identical to first configuration index;
   and ignore the first write request if it is determined that the received configuration index is not identical to first configuration index.

2. The system according to claim 1, comprising:
   a secondary storage unit comprising:
   a second non-volatile memory;
   a second memory storing processor-executable process steps; and
   a second processor to execute the processor-executable process steps to cause the secondary storage unit to:
   receive the first write request from the primary storage unit;
   in response to reception of the first write request, persist the first value in the second non-volatile memory in association with the first key, and transmit the acknowledgement of the first write request and the first set of locally-durable keys to the primary storage unit;

receive the second write request and the second set of globally-durable keys from the primary storage unit; and in response to reception of the second write request and the second set of globally-durable keys, persist the second value in the second non-volatile memory in association with the second key, persist a listing of the second set of globally-durable keys, and transmit the acknowledgement of the second write request and a second set of locally-durable keys to the primary storage unit, the second set of locally-durable keys including the first key and the second key.

3. The system according to claim 2, comprising:
a management host comprising:
a third memory storing processor-executable process steps; and
a third processor to execute the processor-executable process steps to cause the management host to:
determine to remove a storage unit from the storage cluster;
instruct each storage unit of the storage cluster to become read-only;
receive a list of globally-durable and locally-durable keys from one or more of the storage units of the cluster;
determine a recovery set of globally-durable keys based on the lists of globally-durable and locally-durable keys;
define a second storage cluster comprising two or more storage units, the two or more storage units comprising a prior storage unit which was a storage unit of the storage cluster and a prior storage unit which was not a storage unit of the storage cluster; and
transmit the recovery set of globally-durable keys to the two or more storage units of the second storage cluster.

4. The system according to claim 1, the first processor to further execute the processor-executable process steps to cause the system to:
receive a third write request from a second client including a third key and a third value;
persist the third value in the first non-volatile memory in association with the third key;
broadcast the third write request and a third set of globally-durable keys to the one or more secondary storage units;
receive, from each of the one or more secondary storage units, an acknowledgement of the third write request and a third set of locally-durable keys, each of the third sets of locally-durable keys including the first key, the second key and the third key; and
in response to the reception of the acknowledgement of the third write request and the third set of locally-durable keys from each of the one or more secondary storage units, transmit an acknowledgement of the second write request to the client.

5. The system according to claim 4, the first processor to further execute the processor-executable process steps to cause the system to:
receive a fourth write request from the second client including a fourth key and a fourth value;
persist the fourth value in the first non-volatile memory in association with the fourth key;
broadcast the fourth write request and a fourth set of globally-durable keys to the one or more secondary storage units;

receive, from each of the one or more secondary storage units, an acknowledgement of the fourth write request and a fourth set of locally-durable keys, each of the fourth sets of locally-durable keys including the first key, the second key, the third key and the fourth key; and in response to the reception of the acknowledgement of the fourth write request and the fourth set of locally-durable keys from each of the one or more secondary storage units, transmit an acknowledgement of the third write request to the second client.

6. The system according to claim 1, comprising:
a management host comprising:
a third memory storing processor-executable process steps; and
a third processor to execute the processor-executable process steps to cause the management host to:
determine to remove a storage unit from the storage cluster;
instruct each storage unit of the storage cluster to become read-only;
receive a list of globally-durable and locally-durable keys from one or more of the storage units of the cluster;
determine a recovery set of globally-durable keys based on the lists of globally-durable and locally-durable keys;
define a second storage cluster comprising two or more storage units, the two or more storage units comprising a prior storage unit which was a storage unit of the storage cluster and a prior storage unit which was not a storage unit of the storage cluster; and
transmit the recovery set of globally-durable keys to the two or more storage units of the second storage cluster.

7. The system according to claim 6, wherein determination of the recovery set comprises:
determination of ((union globally-durable keys from received lists) union (intersection locally-durable keys from received lists)).

8. The system according to claim 6, wherein the primary storage unit stores a first configuration index associated with the storage cluster, wherein the first write request includes a configuration index, and wherein the first processor is to execute the processor-executable process steps to cause the primary storage unit to:
determine whether the received configuration index is identical to first configuration index, and
wherein the third processor is to execute the processor-executable process steps to cause the management host to:
associate a second configuration index associated with the second storage cluster; and
transmit the second configuration index to the two or more storage units of the second storage cluster.

9. A method for a storage cluster comprising a primary storage unit and one or more secondary storage units, the method comprising:
defining two or more epochs from a directory of available storage units and storage cluster configuration information, each of the epochs specifying a primary storage unit and a respective set of secondary storage units of the one or more secondary storage units;
setting each of the one or more secondary storage units to a respective epoch selected from the two or more epochs;
designating one of the two or more epochs as a current epoch;

receiving, at the primary storage unit, a first write request from a client including a first key and a first value;

persisting the first value in a first non-volatile memory of the primary storage unit in association with the first key;

broadcasting the first write request and a first set of globally-durable keys to the one or more secondary storage units;

receiving, from each of the one or more secondary storage units set to the current epoch, an acknowledgement of the first write request and a first set of locally-durable keys, each of the first sets of locally-durable keys including the first key;

each of the one or more secondary storage units not set to the current epoch ignoring or rejecting the first write request;

receiving, at the primary storage unit, a second write request from the client including a second key and a second value;

persisting the second value in the first non-volatile memory in association with the second key;

and broadcasting the second write request and a second set of globally-durable keys to the one or more secondary storage units, the second set of locally-durable keys including the first key;

wherein the primary storage unit stores a first configuration index associated with the storage cluster, wherein the first write request includes a configuration index, and further comprising:

receiving the first write request comprises determining whether the received configuration index is identical to first configuration index, and ignoring the first write request if it is determined that the received configuration index is not identical to first configuration index.

10. The method according to claim 9, further comprising:

receiving, at one of the one or more secondary storage units, the first write request from the primary storage unit;

in response to reception of the first write request, persisting the first value in a second non-volatile memory of the one of the one or more secondary storage units in association with the first key, and transmitting the acknowledgement of the first write request and a third set of locally-durable keys including the first key to the primary storage unit;

receiving the second write request and the second set of globally-durable keys from the primary storage unit; and in response to reception of the second write request and the second set of globally-durable keys, persisting the second value in the second non-volatile memory in association with the second key, persisting a listing of the second set of globally-durable keys, and transmitting the acknowledgement of the second write request and a second set of locally-durable keys to the primary storage unit, the second set of locally-durable keys including the first key and the second key.

11. The method according to claim 10, further comprising:

determining, at a management host, to remove a storage unit from the storage cluster;

instructing each storage unit of the storage cluster to become read-only;

receive a list of globally-durable and locally-durable keys from one or more of the storage units of the cluster;

determine a recovery set of globally-durable keys based on the lists of globally-durable and locally-durable keys;

defining a second storage cluster comprising two or more storage units, the two or more storage units comprising a prior storage unit which was a storage unit of the storage cluster and a prior storage unit which was not a storage unit of the storage cluster; and transmitting the recovery set of globally-durable keys to the two or more storage units of the second storage cluster.

12. The method according to claim 9, further comprising:

receiving, at the primary storage unit, a third write request from a second client including a third key and a third value;

persisting the third value in the first non-volatile memory in association with the third key;

broadcasting the third write request and a third set of globally-durable keys to the one or more secondary storage units;

receiving, from each of the one or more secondary storage units, an acknowledgement of the third write request and a third set of locally-durable keys, each of the third sets of locally-durable keys including the first key, the second key and the third key; and in response to the reception of the acknowledgement of the third write request and the third set of locally-durable keys from each of the one or more secondary storage units, transmit an acknowledgement of the second write request to the client.

13. The method according to claim 12, further comprising:

receiving, at the primary storage unit, a fourth write request from the second client including a fourth key and a fourth value;

persisting the fourth value in the first non-volatile memory in association with the fourth key;

broadcasting the fourth write request and a fourth set of globally-durable keys to the one or more secondary storage units;

receiving, from each of the one or more secondary storage units, an acknowledgement of the fourth write request and a fourth set of locally-durable keys, each of the fourth sets of locally-durable keys including the first key, the second key, the third key and the fourth key; and in response to the reception of the acknowledgement of the fourth write request and the fourth set of locally-durable keys from each of the one or more secondary storage units, transmitting an acknowledgement of the third write request to the second client.

14. The method according to claim 9, further comprising:

determining, at a management host, to remove a storage unit from the storage cluster;

instructing each storage unit of the storage unit to become read-only;

receiving a list of globally-durable and locally-durable keys from one or more of the storage units of the cluster;

determining a recovery set of globally-durable keys based on the lists of globally-durable and locally-durable keys;

defining a second storage cluster comprising two or more storage units, the two or more storage units comprising a prior storage unit which was a storage unit of the storage cluster and a prior storage unit which was not a storage unit of the storage cluster; and transmitting the recovery set of globally-durable keys to the two or more storage units of the second storage cluster.

15. The method according to claim 14, wherein determining the recovery set comprises:
determining ((union globally-durable keys from received lists) union (intersection locally-durable keys from received lists)).

16. The method according to claim 14, wherein the primary storage unit stores a first configuration index associated with the storage cluster, wherein the first write request includes a configuration index, and further comprising:
receiving the first write request comprises determining whether the received configuration index is identical to first configuration index,
wherein defining the second storage cluster comprises associating a second configuration index associated with the second storage cluster, and
wherein transmitting the recovery set of globally-durable keys to the two or more storage units comprises transmitting the second configuration index to the two or more storage units of the second storage cluster.

\* \* \* \* \*